Patented May 14, 1946

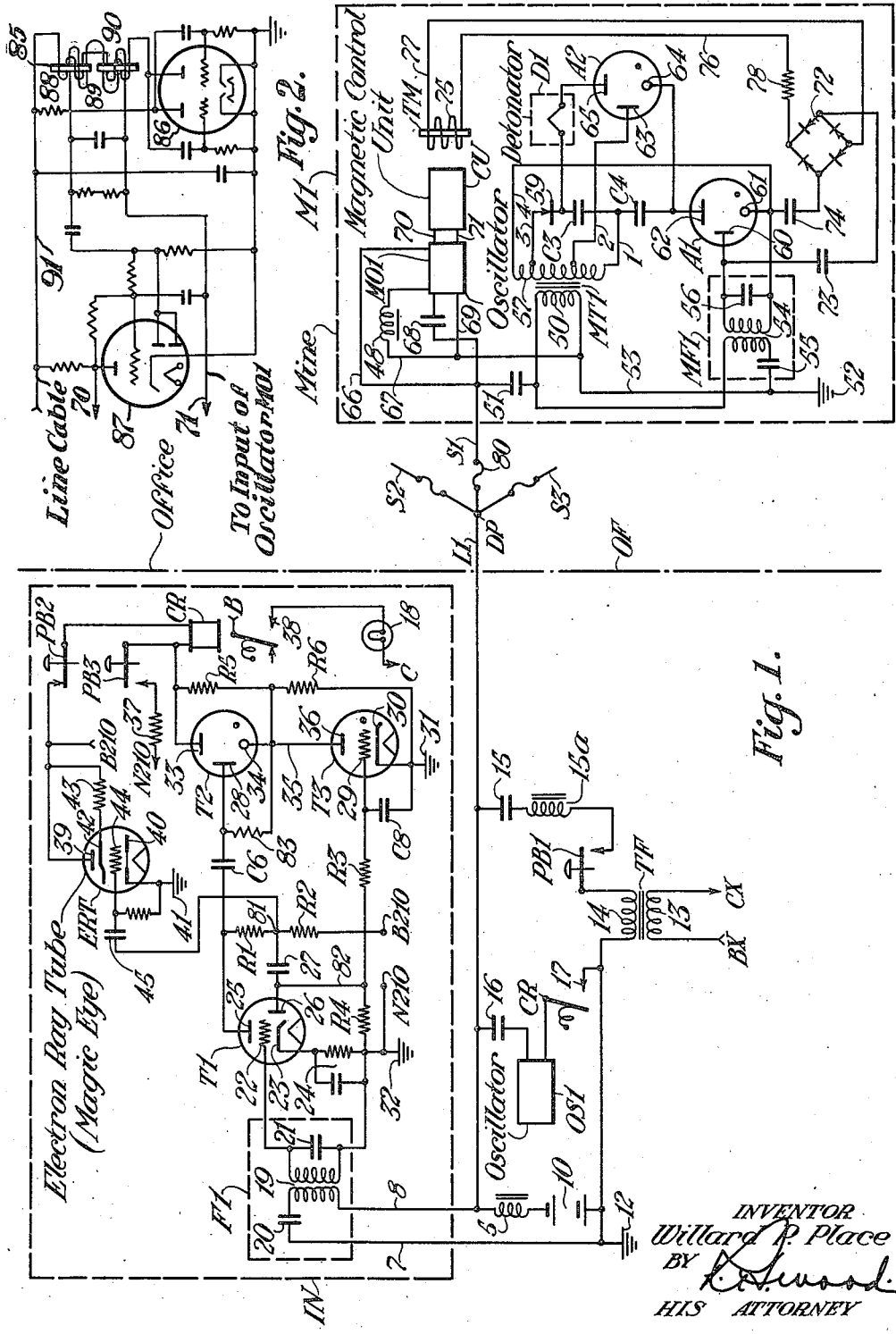

2,400,258

UNITED STATES PATENT OFFICE 2,400,258

APPARATUS FOR SELECTIVE CONTROL AND INDICATION SYSTEMS

Willard P. Place, Penn Township, Allegheny County, Pa., assignor to The Union Switch & Signal Company, Swissvale, Pa., a corporation of Pennsylvania Application September 30, 1942, Serial No. 460,238

6 Claims. (Cl. 102—11)

My invention relates to apparatus for selective control and indication systems, and more particularly to apparatus for individual control and indication of electrical equipments.

Selective systems frequently control and indicate a group of similar electrical equipments by use of currents of different characteristics, the sources of such currents being located at a remote point or office and selectively supplied to a transmitting circuit extending from the office to the equipments. Safety, reliability and selectivity are of great importance in such a system.

Accordingly, a feature of my invention is the provision of novel and improved apparatus for individual control and operation of an electrical equipment.

Another feature of my invention is the provision of electrical equipment control apparatus incorporating novel means wherewith safety, reliability and selectivity of operation are obtained.

Still another feature of my invention is the provision of novel apparatus for indicating a plurality of different conditions of an electrical equipment.

Again, a feature of my invention is the provision of control and indication apparatus of the type here involved incorporating novel means for testing the apparatus.

A peculiar feature of my invention is the provision of novel and improved apparatus for control, indication, testing and firing of a mine of a submarine mine field.

Other features, objects and advantages of my invention will appear as the specification progresses.

To attain the above, features, objects and advantages of my invention, I provide the control office with a source of direct current and a plurality of sources of different alternating currents. One of the alternating currents is of a first frequency and is used as an operating current and would be common for all the equipments. Other alternating currents are used as control currents and each is of a frequency preselected to make it individual for a particular electrical equipment. The operating alternating current is preferably of a relatively high voltage, and the control alternating currents are preferably of a relatively low voltage. The direct current source continuously supplies current to the transmitting circuit. The sources of alternating current are connected to the transmitting circuit through control devices which are arranged to connect these sources to the circuit one at a time or simultaneously. At each equipment a transformer and a filter are connected to the transmitting circuit in multiple, the transformer transferring the relatively high voltage operating current for applying proper voltages to other circuit parts by suitable taps on a secondary winding of the transformer. The filter is tuned to pass only current of the frequency preselected for the control current of that equipment. A condenser of relatively large capacity is connected to preselected taps of the secondary winding through a rectifier and is charged in response to the operating current, such condenser serving as a secondary energy source from which operating energy can be derived by the discharge thereof. Two gas filled electron tubes are provided in each equipment to control the discharging of the condenser. The first one of the tubes has its control electrodes connected to the filter and its anode and cathode connected to preselected taps of the secondary winding through a second condenser. With both operating and control currents present the first tube breaks down and the second condenser is charged by the anode current, and the second condenser becomes an additional secondary source of energy. The second tube has its control electrode connected to a preselected tap of the secondary winding of the transformer and its anode and cathode connected across the two condensers in series. When both condensers are fully charged, the voltage across the two condensers in series is sufficient to break down the second tube, and the two condensers discharge through the second tube. The operating element of the electrical equipment is interposed in the anode circuit of the second tube and the energy discharged from the condensers is of sufficient magnitude to cause operation thereof.

An indication generator or oscillator of each electrical equipment is connected to the transmitting circuit to be energized by the direct current supplied by the office source. With the oscillator thus energized it delivers to the transmitting circuit an indication current of a frequency preselected for the particular electrical equipment. Preferably this indication oscillator is of the form that the amplitude of its output current is made to increase above a normal value, or decrease below such normal value through a control unit associated with the oscillator and which unit is influenced by bodies of magnetizable material and by magnetic fields. At the office I provide indication apparatus for each equipment and each such indication apparatus is connected to the transmitting circuit through a filter tuned to pass only current of the respective indication frequency. Each indication apparatus includes a relay operated when the indication current increases and decreases from its normal value, the relay being operated only when an increase is followed by a decrease or vice versa. I preferably accomplish such relay operation by using two gas filled tubes connected in series with each other and with the relay. An increase above normal in the amplitude of the indication current causes one of the tubes to break down and a decrease below normal causes the other tube to break down, and the relay operates only when both tubes are conductive. This relay can be used to control indicators and other devices as desired. As a visual indication of the strength of the indication current, an electron ray tube, or so called "magic eye" is included in the office indication apparatus.

I shall describe one form of apparatus embodying my invention and shall then point out the novel features thereof in claims.

In the accompanying drawing, Fig. 1 is a diagrammatic view showing one form of apparatus embodying my invention when used to control and indicate a mine of a mine field. Fig. 2 is a diagrammatic view showing one form of a control unit for use with the apparatus of Fig. 1. It will be understood that the invention is not limited to this one use, but that such use will serve to illustrate the many places where apparatus embodying my invention is useful. Furthermore, it is to be noted that that portion of the apparatus used for control may be used independently of that portion of the apparatus used for indication and vice versa.

Referring to Fig. 1, the reference character OF designates an office from which a mine field is controlled, the dash rectangle MI indicating one of the mines of the mine field. The mine MI is provided with an electrical equipment for firing the mine and for detecting a vessel in the vicinity thereof, such detection being indicated at the office. The equipment for each of the other mines of the mine field would be similar to that for mine MI except for the tuning of the equipment. The office OF is connected to the mine field by a transmitting circuit, and as disclosed, one side of this circuit is formed by a single conductor cable LI, and the other side is completed through a ground path as will be made clear presently, but a metallic conductor can be used in place of the ground path if desired. The cable LI extends from the office to a junction or distribution point DP from which single conductor cables in multiple extend to the different mines, a cable SI extending to mine MI and two broken cables S2 and S3 extending to two other mines, not shown.

The office OF is provided with a source of direct current, sources of alternating currents and indication apparatus. The source of direct current is a battery 10 which is connected to the transmitting circuit by having one terminal connected to conductor LI through an inductance 5, and its other terminal connected to a ground electrode 12. One source of alternating current is a transformer TF whose primary winding 13 is supplied with alternating current from any suitable source, such as, for example, a 60 cycle alternating current generator whose terminals are indicated at BX and CX. Secondary winding 14 of transformer TF is connected to the transmitting circuit for supplying operating current thereto, one terminal of secondary winding 14 being connected to ground electrode 12 and its other terminal being connected to conductor LI through a manually operable circuit controller PB1 and a tuned circuit comprising a condenser 15 and an inductance 15a. A second source of alternating current is an oscillator OS1, which is connected to the transmitting circuit to supply control current thereto, one output terminal of oscillator OS1 being connected to conductor LI through a condenser 16, and the other output terminal being connected to ground electrode 12 through reverse polar contact 17 of a polar relay CR to be referred to later. The oscillator OS1 may be any one of several types, such as, for example, an electron tube oscillator, and it is shown conventionally since its specific structure forms no part of my present invention. It is sufficient for this application to point out that oscillator OS1 is active to supply alternating current of a preselected frequency and which frequency is preselected to be individual for mine M1, and I shall assume by way of illustration that oscillator OS1 delivers current at 1,000 cycles per second. The operating current is preferably of a relatively high voltage, such as, for example, 150 volts, and the indication current is of a relatively low voltage, such as, for example, 20 volts. It follows that the transmitting circuit is constantly supplied with direct current, is supplied with operating current by operation of controller PB1 and is supplied with control current when relay CR is operated to close its polar contact 17, the two alternating currents being supplied either one at a time or simultaneously according to the operation of controller PB1 and relay CR.

The office indication apparatus for mine MI is indicated as a whole by a dash rectangle IN, and this apparatus comprises a filter F1, three electron tubes T1, T2 and T3, a polar relay CR, two manually operable controllers or push buttons PB2 and PB3, an indication lamp 18 and an electron ray tube ERT, together with proper current sources and circuit connections. The filter F1 includes a transformer 19 and two condensers 20 and 21, the input side of the filter being connected to conductor LI and ground electrode 12 of the transmitting circuit by wires 7 and 8, and its output side being connected to a control grid circuit of tube T1, to be described presently. Filter F1 is tuned to pass only current of the frequency used for indication of the mine M1, and I shall assume by way of illustration that it is tuned to pass only current of the frequency of 10,000 cycles per second.

Tube T1 is a high vacuum type of diode-triode tube for amplifying and rectifying the indication current passed by filter F1. Control grid 22 and cathode 23 of tube T1 are connected to filter F1 through a bias unit 24. Plate voltage for tube T1 is derived from power terminals B210 and N210, which are connected to a suitable source of direct current, such as a generator not shown, and which generator supplies current of a suitable voltage, such as, for example, 210 volts. The plate circuit for tube T1 can be traced from terminal B210 through resistors R2 and R1 in series, plate 25 and intervening tube space to cathode 23 of tube T1, and biasing unit 24 to terminal N210. The junction terminal 81 of resistors R1 and R2 is connected to diode element 26 of tube T1 through a condenser 27. It is clear that the indication current passed by filter F1 is amplified in the plate circuit of tube T1 and a portion of the amplified current is rectified through the diode element 26.

Tubes T2 and T3 are gas filled tubes governed by the amplified energy of tube T1, and preferably tube T2 is of the cold cathode type and tube T3 is of the hot cathode type. The control electrode 28 of tube T2 is coupled to the plate circuit of amplifier tube T1 through a condenser C6 and a resistor 83 is connected across electrode 28 and cathode 34, and consequently an alternating electromotive force is applied to electrode 28 of tube T2 due to the alternating current component of the plate circuit current of tube T1, and such applied electromotive force is proportional to the amplitude of such alternating current component. In other words, the amplitude of the electromotive force applied to control electrode 28 of tube T2 is proportional to the amplitude of the indication current passed by filter F1. The parts are so arranged that the electromotive force applied to control electrode 28 due to indication current of normal amplitude is not enough to excite the tube T2 to a breakdown point for a given anode voltage, but if the applied electromotive force is increased a certain amount, tube T2 becomes sufficiently excited to break down. The control electrode 29 of tube T3 is coupled to the diode element 26 of tube T1 to receive a direct bias electromotive force or voltage due to the rectifying action of the diode element 26. Control electrode 29 of tube T3 is connected to the cathode 30 of the tube through a condenser C8, the junction of condenser C8 and cathode 30 being connected to a ground electrode 31. By another connection the electrode 29 is connected to cathode 23 of tube T1 through resistors R3 and R4 and the bias unit 24, the junction of resistors R3 and R4 being connected to diode element 26 by wire 82, and the junction of resistor R4 and bias unit 24 being connected to a ground electrode 32. Due to the diode element 26 rectifying a portion of the alternating component of the plate circuit current, the condenser C8 is charged with a direct voltage through the circuit connection traced above, and electrode 29 of tube T3 is made negative in potential with respect to cathode 30. The parts are so arranged that this negative bias voltage of tube T3 is sufficient to prevent tube T3 from breaking down for a given anode voltage when the indication current is of normal amplitude, but when the indication current falls a certain amount below the normal value, the charge on condenser C8 leaks away through resistors R3 and R4 and allows tube T3 to become conductive.

Tubes T2 and T3 are connected in series in an anode circuit for controlling the relay CR, a voltage divider made up of resistors R5 and R6 distributing the voltage to the two tubes. This anode circuit extends from terminal B210 of the current source through controller PB2, winding of relay CR, anode 33 and intervening tube space to cathode 34 of tube T2, an inter-tube connection 35, anode 36 and intervening tube space to cathode 30 of tube T3, and ground electrodes 31 and 32 to terminal N210. Resistors R5 and R6 in series are connected across anode 33 of tube T2 and cathode 30 of tube T3 and their junction terminal is connected to the inter-tube connection 35. As stated hereinbefore, the voltage applied to the anode of each tube T2 and T3 is not sufficient to break down the tube when the grid bias voltage is that effected in response to indication current of normal amplitude. The anode voltage, however, is sufficient to break down tube T2 or T3, as the case may be, when the grid bias voltage is varied a certain amount from the normal value, and also the anode voltage of each tube is sufficient to maintain the tube conductive after it has been broken down. When tube T2 alone breaks down, current flows through resistor R6 to maintain tube T2 conductive, and if tube T3 alone breaks down, current flows through resistor R5 to maintain tube T3 conductive. Relay CR is preferably a biased polar relay, and as disclosed the armature of the relay is spring biased to a normal or left-hand position. Relay CR is interposed in the anode circuit of tubes T2 and T3, as explained above, and the relay is energized by the anode current at a polarity as required to operate the relay armature to the reverse or right-hand position. Relay CR is adjusted so that when neither one or when either one of the tubes T2 or T3 alone is conductive, the anode current is not sufficient to operate the relay to the reverse position, but that when both tubes T2 and T3 are conductive simultaneously, the resultant anode current energizes relay CR sufficiently to reverse the relay.

A typical operation condition may be helpful in the understanding of the operation of tubes T2 and T3 and relay CR. Taking the voltage of the current source B210—N210 to be 210 volts, relay CR to have a resistance of 10,000 ohms, resistor R5 to be of 0.5 megohm, and resistor R6 to be of 0.2 megohm, the voltage drop through the relay is negligible when neither tube is conductive and about 150 volts is impressed across tube T2 and about 60 volts is impressed across tube T3. If tube T2 alone breaks down, the current flowing will be equal to 210 volts minus the voltage drop through tube T2 which is about 70 volts, divided by the resistance of resistor R6 and relay CR (0.2 megohm plus 10,000 ohms) and is about 0.7 milliampere. A voltage of approximately 140 volts is now applied across the anode-cathode of tube T3 and makes this tube somewhat more ready to break down should its grid bias voltage be varied. If tube T3 alone breaks down, the current flowing in the anode circuit is about 0.4 milliampere since the drop through tube T3 is about 18 volts and relay CR is in series with resistor R5 (10,000 ohms plus 0.5 megohm). The voltage across the anode-cathode of tube T2 is now increased to about 190 volts and that tube becomes somewhat more sensitive to a change in its grid voltage. If both tubes T2 and T3 are broken down, the current flowing in the anode circuit is equal to 210 volts minus the voltage drop of both tubes (70 plus 18 volts) divided by the resistance of relay CR (10,000 ohms) and is about 12 milliamperes. This current is sufficient to operate relay CR.

Relay CR can also be energized by means of a circuit controlled by the manual operable controller PB3, the circuit including terminal B210, controller PB2, winding of relay CR, controller PB3, resistor 37 and terminal N210. It is to be seen therefore that relay CR can be operated either automatically through tubes T2 and T3 in response to the indication current received from the transmitting circuit, or it can be operated manually through push button PB3, automatic operation of relay CR requiring both tubes T2 and T3 to be conductive.

Relay CR is used to control indication lamp 18, lamp 18 being illuminated through an obvious circuit including reverse polar contact 38 of relay CR and a current source whose terminals are indicated at B and C. Operation of relay CR to close its polar contact 17 also connects the oscillator OS1 to the transmitting circuit as explained hereinbefore.

Tube ERT of the indication apparatus is of the electron ray or so-called "magic eye" type designed to indicate visually by means of a fluorescent target a change in the controlling voltage. Tube ERT is preferably a high vacuum indirectly heated cathode tube and is controlled by the amplified energy of tube T1 to visualize changes in the amplitude of the received indication current. A combination plate and control electrode 42 of tube ERT is connected to terminal B210 of the current source through a resistor 43 and cathode 40 of the tube is connected to terminal N210 through ground electrodes 41 and 32 to form an anode circuit for the tube. A ray controlled or target electrode 39 of the tube is connected directly to terminal B210 and control grid 44 of the tube is connected to the plate circuit of tube T1 through a condenser 45. Thus the potential of grid 44 with respect to cathode 40 is determined by the strength of the amplified alternating voltage of the plate circuit current of tube T1 and in turn is proportional to the strength of the received indication current. When the amplified alternating voltage is that created by an indication current of normal amplitude, the electron ray tube ERT is operated in the usual manner to produce a glow on the target, the target appearing with a predetermined shadow angle. A decrease in the controlling voltage applied to tube ERT due to a decrease in the amplitude of the indication current varies the shadow angle in one sense and an increase in the controlling voltage due to an increase of the amplitude of the indication current varies the shadow angle in the opposite sense. This visual indication of the target of tube ERT provides a check that the strength of the indication current is maintained at its normal value, and also provides an indication of a change in the strength of the indication current either up or down, such indication at tube ERT being effected before relay CR is operated to cause lamp 18 to be illuminated.

The equipment for mine M1 includes as essential elements, a transformer MT1, a filter MF1, two condensers C3 and C4, two electron tubes A1 and A2, a detonator D1, an indication oscillator MO1, a control unit CU and testing means.

The transformer MT1 and filter MF1 are connected in multiple to the transmitting circuit. One terminal of primary winding 50 of transformer MT1 is connected to cable S1 through a condenser 51 and the other terminal is connected to a ground electrode 52 by wire 53. Filter MF1 comprises a transformer 54 and two condensers 55 and 56, one input terminal of the filter being connected to cable S1 through condenser 51 and its other input terminal being connected to ground electrode 52 by wire 53. Transformer MT1 transfers the operating alternating current of relatively high voltage supplied at times to the transmitting circuit at the office as already explained. That is, it transfers the 150 volt 60 cycle current and its secondary winding 57 is provided with four taps identified by the numerals 1, 2, 3 and 4, to supply proper preselected voltages to other parts of the equipment in response to the operating current. Filter MF1 is tuned to pass only current of the frequency preselected for the control current of mine M1, and in the case here assumed it is tuned to pass only current of 1,000 cycles per second as supplied by the office oscillator OS1. The turn ratio of filter transformer 54 is proportioned so that the relatively low voltage of 20 volts for the control current is transferred to a voltage sufficiently high to excite tube A1 which is connected to the filter as will presently appear.

Tube A1 is a gas filled tube whose control electrode 60 and cathode 61 are connected to the filter MF1 and whose anode 62 and cathode 61 are connected to taps 1 and 4 of secondary winding 57 of transformer MT1 through condenser C4, the parts being proportioned for taps 1 and 4 to supply a designated voltage of say 110 volts in response to the 150 volt operating current. Furthermore, tube A1 is proportioned to break down when control electrode 60 is excited by the control current and its anode 62 receives energy from transformer secondary winding 57, and when tube A1 breaks down condenser C4 is charged with a direct voltage of the order of 70 volts due to the rectifying action and voltage drop of tube A1. Condenser C3 is connected across taps 1 and 3 of secondary winding 57 through a rectifier 59 and is charged at a direct voltage corresponding to alternating voltage supplied from taps 1 and 3 and to aid in an understanding of the equipment I shall assume that condenser C3 is charged at about 100 volts.

Tube A2 is also a gas filled tube whose control electrode 63 is connected to tap 2 of secondary winding 57 and whose cathode 64 is connected to the junction of condenser C4 and anode 62 of tube A1. Tap 2 is disposed to supply a preselected voltage to control electrode 63, and I shall assume that it is disposed to supply about 25 volts in response to the 150 volt operating current. Anode 65 of tube A2 is connected to the junction of condenser C3 and rectifier 59, the detonator D1 being interposed in this anode connection. Detonator D1 is the operating element of the equipment and is of the usual construction for such devices wherewith energy of a definite magnitude is effective to cause the detonator to immediately fire the mine, but that energy below such critical magnitude causes no action.

To agree with the voltages assumed for the two sources of alternating current, the tubes A1 and A2 have operating characteristics such that when no voltage is applied between their control electrode and cathode, approximately 300 volts are required to start a discharge between anode and cathode, but when about 80 volts positive is applied to the control electrode a discharge between the anode and cathode starts with about 100 volts applied to the anode. With the operating alternating current only present, condenser C3 is charged at about 100 volts, as previously explained, and this voltage is applied across the anode 65 and cathode 64 of tube A2. Also about 25 volts are applied from tap 2 to control electrode 63 of tube A2 and about 110 volts are applied between the anode 62 and cathode 61 of tube A1. These voltages are far below those required to break down either tube. If the control alternating current only is present, then only the control electrode 60 of tube A1 is excited. If both the control and operating currents are present, tube A1 is excited through filter MF1 and breaks down due to the voltage applied to its anode through the transformer MT1 and condenser C4 is charged at about 70 volts as explained hereinbefore. Since condensers C3 and C4 are in series, their combined voltage of 170 volts is applied between anode 65 and cathode 64 of tube A2. In addition, the 70 volts from condenser C4 is added to the 25 volts from tap 2 and the combined voltage is supplied to control electrode 63 of tube A2, with the result that the tube A2 breaks down. With tube A2 made conductive, the condensers C3 and C4 discharge through detonator D1 in series with tube A2 and the magnitude of the discharged energy is sufficient to immediately fire the mine.

Indication oscillator MO1 has its input terminals connected to the transmitting circuit by wires 66 and 67 and an inductance 48, and its output terminals connected to the circuit through a condenser 68 and wire 69. Oscillator MO1 may be, for example, of the electron tube type and is shown conventionally since its specific structure forms no part of my invention. It is sufficient for this application to point out that oscillator MO1 when energized by direct current supplied to the transmitting circuit by the office battery 10 is active to supply a periodic current of a preselected frequency, and which frequency is made individual from mine M1. To agree with the assumed frequency for the office indication apparatus, oscillator MO1 is adjusted to supply periodic current of 10,000 cycles per second, the indication current being continuously present since the transmitting circuit is continuously energized by battery 10. Control unit CU is associated with and made a part of the oscillator MO1, unit CU being shown connected to the oscillator by wires 70 and 71. The construction of control unit CU also forms no part of my invention and this device is shown conventionally in Fig. 1 for the sake of simplicity and it may take the form disclosed in Fig. 2.

Referring to Fig. 2, the control unit CU includes a detector 85, an oscillator tube 86 and a rectifier-amplifier tube 87. The detector 85 comprises two cores such as "Mu-metal," on which two primary windings 88 and 89 are wound side by side and turned so that the cores are excited in opposite senses. A single secondary winding 90 is wound over the primary windings. The oscillator tube 86 is a two section tube arranged so that the output voltage of each section supplies grid excitation for the other section. The anodes of the tube receive power from the line circuit through wire 91, the primary windings 88 and 89 being interposed in the connection to one of the anodes. The oscillations created by tube 86 excite the two cores of the detector exactly the same and there is normally no voltage induced in the secondary winding 90. When an outside magnetic field threads the cores the balance caused by the primary windings 88 and 89 is disturbed and a voltage is induced in the secondary windings 90 due to the oscillations of tube 86. This voltage induced in secondary winding 90 is applied to tube 87 where it is rectified by the diode section of the tube, filtered, and the resulting rectified voltage applied to the triode section of the tube. Amplified variations of this direct voltage appear at the anode circuit of the triode section and are applied to the input of the oscillator MO1 through wires 70 and 71 and are used to amplitude modulate the output of the oscillator MO1. As stated hereinbefore, the oscillator MO1 may be an electron tube oscillator of standard form and a direct voltage of one polarity applied to its grid circuit will serve to increase the amplitude of the oscillations and a direct voltage of the opposite polarity will serve to decrease the amplitude of the oscillations. Thus an outside magnetic field of one sense will cause a direct voltage of a polarity to increase the amplitude of the output of oscillator MO1 and a magnetic field of the opposite sense will cause a direct voltage of the other polarity to decrease the amplitude of the output of the oscillator.

When a vessel having portions made of magnetizable material, such as a steel hull, approaches the mine and moves along the mine in relatively close proximity thereto, the control unit CU is influenced and the oscillator MO1 is governed to cause the indication current to first increase in amplitude above the normal value and then decrease below the normal value or vice versa. In other words, oscillator MO1 normally supplies an indication current of a preselected frequency and of a predetermined amplitude and the presence of a vessel in the vicinity of the mine is detected by an increase in the amplitude of the indication current followed by a decrease in the amplitude of the current or vice versa.

The testing means for mine M1 includes a magnet TM which is energized by energy passed by filter MF1 and rectified at a full wave rectifier 72, whose input terminals are connected to the output side of the filter MF1 through condensers 73 and 74, and whose output terminals are connected to winding 75 of magnet TM by wires 76 and 77, a current limiting resistor 78 being interposed in wire 76. Thus the presence of the 1,000 cycle control current causes magnet TM to be energized to create a magnetic field in close proximity to the control unit CU and which magnetic field influences unit CU and oscillator MO1 is governed to deliver an indication current whose amplitude is varied above and below the normal value by the magnetic field. That is to say, the magnetic field created by magnet TM influences the control unit CU in a manner similar to the influence created by a vessel of steel construction.

In describing the operation of the apparatus, I shall assume that the apparatus occupies the position shown in the drawing. At this position the oscillator MO1 is energized by direct current supplied by office battery 10, and the indication current supplied by oscillator MO1 is of its normal amplitude. Indication current is passed by filter F1 of the office indication apparatus, amplified at tube T1 and causes electron ray tube ERT to be illuminated for its target to show a given shadow angle. I shall next assume that a vessel, such as a submarine, moves into the vicinity of mine M1. The presence of such vessel influences control unit CU and oscillator MO1 is controlled to supply indication current that first increases in amplitude above the normal value and then decreases to a value below the normal value. Such characteristic of the indication current breaks down tubes T2 and T3 of the office apparatus and operates relay CR to illuminate lamp 18 and to connect oscillator OS1 to the transmitting circuit. Furthermore, this characteristic in the amplitude of the indication current is visualized by changes in the shadow angle of the electron ray tube ERT. In response to such indication of the presence of a vessel in the vicinity of mine M1, the operator can fire the mine by depressing push button PB1 to supply the operating current to the transmitting circuit. The presence of both operating current and control current charges condenser C3, breaks down tube A1 and charges condenser C4. The secondary energy source consisting of condensers C3 and C4 being now fully charged at their full voltages, tube A2 is excited and breaks down with the result that the energy from condensers C3 and C4 discharges through the detonator D1 in series with tube A2 and this energy is sufficient to cause detonator D1 to fire the mine. With the firing of the mine, the mine cable S1 would become grounded, and the excessive flow of current would blow a fuse 80 interposed in cable S1 adjacent the distribution point DP to free the system of mine M1.

If the operator desires to fire the mine with no indication of the presence of a vessel, he can do so by operating push button PB3 to operate relay CR to connect the oscillator OS1 to the transmitting circuit and then actuating push button PB1 to connect transformer TF to the transmitting circuit, the presence of both operating and control currents firing mine M1 as already explained.

The operator can test the apparatus by actuating push button PB3 to operate relay CR and connect oscillator OS1 to the transmitting circuit. The presence of control current energizes magnet TM at the mine causing a magnetic field which would influence the control unit CU with the result that the indication current would have its amplitude varied, and the variations in the amplitude of the indication current would be visualized by changes in the shadow angle of tube ERT.

It is to be understood that although I have assumed for the purpose of illustration definite frequencies and voltages for the different current sources, the invention is not limited to these frequencies and voltages. By changing circuit constants the apparatus can be made to operate in a number of different ways. For instance, the indication apparatus IN can be arranged so that the received energy, that is, the indication current, would have to double its amplitude to break down tube T2 and drop to substantially zero to break down tube T3, it could be arranged so that the received energy would need to increase in amplitude only a few per cent to break down tube T2 and decrease only a small percentage to break down tube T3, or it could be arranged by proper proportioning of resistors R5 and R6 so that one tube T2 or T3 would have to break down first before the other tube could be broken down at all.

Apparatus here disclosed has the advantages that the circuits are safe to a high degree in that no failure of any part of a circuit can cause the firing of the mine. The circuit elements are of a construction that a high degree of reliability is achieved and sufficient frequency margin can be provided for selective control and indication of a relatively large group of mines within reasonable frequency bands.

Although I have herein shown and described only one form of apparatus for selective control and indication systems embodying my invention, it is understood that various changes and modifications may be made therein within the scope of the appended claims without departing from the spirit and scope of my invention.

Having thus described my invention, what I claim is:

1. In combination, an office, a remote point provided with an operating element, a transmitting circuit to connect said office and remote point, an office source of direct current connected to said circuit, an office source of periodic control current of a preselected frequency, an oscillator at said remote point connected to said circuit to receive such direct current and to supply to the circuit a periodic indication current of a preselected frequency different from that of said control current, a control unit connected to said oscillator to create predetermined variations in the amplitude of the indication current in response to a given event, office indication means connected to said circuit through a filter tuned to pass current of the frequency of said indication current only and including a relay operated by said predetermined variations in the amplitude of the indication current, means controlled by said relay to connect said control current source to said circuit when the relay is operated, and control means at said remote point connected to said circuit through a filter tuned to pass current of the frequency of the control current only to control said operating element by said control current.

2. In combination, an office, a remote point provided with an operating element, a transmitting circuit to connect said office and remote point, an office source of direct current connected to said circuit, an office source of periodic control current of a preselected frequency, an oscillator at said remote point connected to said circuit to receive such direct current and to supply to the circuit a periodic indication current of a preselected frequency different from that of said control current, a control unit connected to said oscillator to create an increase and then a decrease in the amplitude of the indication current in response to a given event, office indication means connected to said circuit through a filter tuned to pass current of the frequency of said indication current only and including a relay operated in response to an increase followed by a decrease in the amplitude of the indication current, means including a contact of said relay to connect said control current source to said circuit, and control means at said remote point connected to said circuit through a filter tuned to pass current of the frequency of the control current only to control said operating element.

3. In combination, an office, a remote point provided with an operating element, a transmitting circuit to connect said office and remote point, an office source of direct current connected to said circuit, an office source of periodic control current of a preselected first frequency, an office source of periodic operating current of a preselected second frequency, an oscillator at said remote point connected to said circuit to receive such direct current and to supply to the circuit a periodic indication current of a preselected third frequency, a control unit connected to said oscillator to create a predetermined modulation of the indication current in response to a given event, office indication means connected to said circuit through a filter tuned to pass only current of said third frequency and including a relay operated by said predetermined modulation of the indication current, means controlled by said relay to connect said control current source to said circuit when the relay is operated, other means to connect said operating current source to said circuit, control means at said remote point connected to said circuit through a filter to pass current of said first frequency only, and operating means connected to said circuit through a transformer and governed by said control means to supply energy to said operating element when said operating current is supplied to the circuit.

4. In combination, an office, a mine provided with a detonator, a transmitting circuit to connect the office and mine, an office supply means including a source of direct current and two sources of alternating current, one of said alternating current sources supplying operating current of a relatively high voltage and a preselected first frequency and the other alternating current source supplying control current of a relatively low voltage and a preselected second frequency, said direct current source connected to said circuit, an oscillator at said mine connected to the circuit to receive such direct current and to supply to the circuit an indication current of a preselected third frequency, control means influenced by the presence of a vessel and connected to said oscillator to create predetermined variations in the amplitude of the indication current, office indication means connected to said circuit through a filter tuned to pass current of said third frequency only and including a relay operated by said variations of the indication current amplitude to connect said control current source to said circuit, control means at said mine connected to said circuit through a filter tuned to pass current of said second frequency only, office means to at times connect said operating current source to said circuit, and operating means at the mine connected to said circuit and governed by said control means to energize said detonator by said operating current due to its relatively high voltage.

5. In combination, an office and a remote point connected by a transmitting circuit, an office source of direct current connected to said circuit, an office source of alternating control current of a preselected first frequency, manually operable means to connect said control current source to said circuit, an indication oscillator at said point connected to said circuit to receive such direct current and to supply to the circuit a periodic indication current of a preselected second frequency and of a preselected normal amplitude, a control unit responsive to a magnetic field and connected to said oscillator to cause variations in the amplitude of said indication current, office indication means connected to said circuit through a filter tuned to pass current of said second frequency only and including an indicator governed by variations in the amplitude of the indication current, a filter at said point connected to said circuit and tuned to pass current of said first frequency only, a magnet located adjacent said control unit, and means including a rectifier to connect said magnet to the last mentioned filter to test said oscillator and control unit when said control current source is connected to said circuit.

6. In combination, an office, a mine equipped with a detonator, a circuit extending between said office and mine, an office source of direct current connected to said circuit, a mine oscillator connected to said circuit to be energized by the direct current for supplying to the circuit an indication current of a preselected frequency and of a given normal amplitude, a control unit at the mine influenced by magnetizable material and connected to said oscillator to detect the presence of a vessel having steel portions by causing the amplitude of the indication current to be varied from said normal amplitude, office indication means including an electron ray tube and a controller and connected to said circuit through a filter tuned to pass current of said preselected frequency only, said electron ray tube to indicate by its shadow angle said variations in the amplitude of the indication current and said controller operated to a given position in response to such amplitude variations of the indication current, and office means including a source of control current and connected to said circuit through a contact closed at said given position of the controller for conditioning said detonator to be fired.

WILLARD P. PLACE.